United States Patent [19]

Keating, Jr.

[11] 4,342,621
[45] Aug. 3, 1982

[54] MOLTEN CORE CATCHER AND CONTAINMENT HEAT REMOVAL SYSTEM

[75] Inventor: Stephen J. Keating, Jr., West Hartford, Conn.

[73] Assignee: Combustion Engineering, Inc., Windsor, Conn.

[21] Appl. No.: 840,588

[22] Filed: Oct. 11, 1977

[51] Int. Cl.³ .............................................. G21C 9/00
[52] U.S. Cl. ................................. 376/298; 165/104.27
[58] Field of Search ...................... 176/38, 57; 165/105

[56] References Cited

U.S. PATENT DOCUMENTS

| 3,243,613 | 3/1966 | Grover | 176/57 |
| 3,378,449 | 4/1968 | Roberts | 176/57 |
| 3,607,630 | 9/1971 | West | 176/38 |
| 3,702,802 | 11/1972 | Jansen | 176/38 |
| 3,779,310 | 12/1973 | Russell | 165/105 |
| 3,935,063 | 1/1976 | Dunckel | 176/38 |
| 3,994,776 | 11/1976 | Keller | 176/38 |
| 4,003,785 | 1/1977 | Rau | 176/38 |
| 4,036,688 | 7/1977 | Golden et al. | 176/38 |

FOREIGN PATENT DOCUMENTS 2525554 6/1976 Fed. Rep. of Germany ........ 176/38

OTHER PUBLICATIONS

ANS-*Transactions of the American Nuclear Society*, vol. 13, #1, p. 376; Jul., 1970.
"Designer's Guide to Heat Pipes", *Design News*, Mar., 1974, pp. 159-184.
"A Nuclear Thermionic . . . and Heat Pipes", pp. 424-436, Anderson et al., Nucl. Appl., vol. 5, 12-68.

*Primary Examiner*—Samuel W. Engle
*Assistant Examiner*—Edward F. Miles
*Attorney, Agent, or Firm*—Fishman and Van Kirk

[57] ABSTRACT

An apparatus for cooling molten material resulting from a nuclear reactor core meltdown is disclosed. The apparatus includes a basin positioned under the reactor which is protected against excessive heat by a star-like array of heat pipes whose evaporator sections are disposed above the pan and whose condenser sections are disposed in a heat sink exterior to the containment building of the reactor. Additionally, the vertical walls of the reactor vessel chamber are similarly protected by an array of heat pipes similarly arranged and provided to intercept the radient energy of the molten core material.

9 Claims, 3 Drawing Figures

MOLTEN CORE CATCHER AND CONTAINMENT HEAT REMOVAL SYSTEM

BACKGROUND OF THE INVENTION

1. Field of the Invention

The present invention relates to an apparatus and system for cooling molten core material resulting from the meltdown of a nuclear reactor. More specifically, the present invention is a system designed to prevent the "China Syndrome" in the case of a nuclear accident and proposes a passive system which optimally utilizes heat pipes to provide cooling and solidification of the molten core so that core boiling and containment breach do not occur.

2. Description of the Prior Art

Following the release of the "Rasmussen Report" (WASH-1400, August 1974), a great deal of attention has been focused on the risks of serious nuclear reactor accidents by not only the members of the nuclear industry and the appropriate governmental licensing bodies but also by interested and concerned members of the public at large. The Rasmussen Report concludes that the risks of such an accident are dominated by those potential accidents which lead to the melting of the reactor core. One possible consequence of a core melt has been popularly dubbed "The China Syndrome" in which it is prophesied that the molten core will fall to and melt through the bottom of the reactor vessel as well as the underlying containment structure. If such extreme results were to occur, the containment would be breached and large amounts of radioactive material could be released to the environment either by way of the atmosphere or by way of the ground water at the site.

In response to the possibility, albeit remote, of such dire consequences, various core catcher concepts have been developed in order that the molten core be prevented from breaching the containment building. One of the earliest core catcher concepts appears in U.S. Pat. No. 3,607,630 issued to John M. West et al on Sept. 21, 1971 and consists of a horizontal flat steel plate underlaid by cooling pipes through which water could flow convectively from a storage tank to a discharge pipe. Other artificially cooled core catcher concepts have subsequently appeared in U.S. Pat. Nos. 3,702,802 issued to G. Jansen Jr. on Nov. 14, 1972; U.S. Pat. No. 3,935,063 issued to Thomas L. Dunckel on Jan. 27, 1976; and U.S. Pat. No. 4,036,688 issued to Martin P. Golden et al on July 19, 1977.

U.S. Pat. No. 3,702,802 is directed to a ceramic oxide eutectic core catcher with a relatively low melting point intended to dissolve the molten core to disperse and dilute the core material in a manner which permits the molten material to be more readily cooled and solidified. U.S. Pat. No. 3,935,063 discloses an arrangement of heat pipes which is intended not only to cool the core itself before it has melted but also to externally cool the vessel to prevent the melted core from melting through the bottom of the vessel. It is not made clear in that patent, however, whether such containment on the interior of the vessel results in a non-critical arrangement or how the top of the vessel is protected against melting. It is also not made clear how the heat pipe arrangement can be expected to work since the proposed apparatus requires the liquid phase of the working fluid of the heat pipe to be raised many feet; a feat which is not ordinarily practical. Furthermore, in all known arrangements in which a container is externally cooled, the system operates in a critical mode since it confines a material which may have a bulk temperature thousands of degrees higher than the melting point of the container. Miscalculations of the system's performance could result in melt-through. Distribution of the molten mass over a large surface area to distribute the heat load and to reduce it to a non-critical configuration is therefore essential. Finally it is not made clear in that patent how access is obtained to the reactor vessel exterior for testing during in service inspections.

U.S. Pat. No. 4,036,688 proposes a complicated core catcher which collects and distributes the molten core after it melts through the reactor vessel. The apparatus is basically a sacrificial bed system including a conical funnel, a core debris receptical including a spherical dome, a spherically layered bed of primarily magnesia bricks, and a zig-zag piping cooling system.

While each of these patents discloses a concept for catching and cooling a molten core, they are each subject to the same or similar difficulties. One difficulty shared by U.S. Pat. Nos. 3,607,630; 3,702,802; and 4,036,688 is that the proposed cooling systems consist of lengthy, sinuously winding or otherwise fluidly connected piping systems which pass adjacent to but under the surface to be cooled. In such systems, the breach of the piping at only one point would render the entire cooling system inoperative. If a pipe break were to occur in a position under the molten core, a circumstance which is not at all unlikely in view of the tremendous heat and weight of a dropped 160 ton core, a dangerous steam explosion might occur releasing large quantities of radioactive material for dispersal throughout the containment, which would, in all likelihood, prevent entry of humans into the containment building foreverafter. In any event, large amounts of steam would rapidly be generated which would have to be condensed in order to prevent unacceptable pressure buildup within the containment. In addition, such extensive arrays of interconnected pipeing are difficult to construct in a manner that would satisfactorily meet the seizmic requirements placed on nuclear power plants.

A second difficulty shared by all of the above mentioned patents is that their cooling systems transfer heat from the molten core to a heat exchanger positioned elsewhere within the containment building since it is not wise to permit such a system to penetrate the containment envelope for fear of pumping radioactive fluid to the exterior of the containment. These arrangements require the existance of a cooling capacity within the containment which greatly exceeds the cooling requirement of any accident less severe than a core meltdown. Thus, the prior art systems pose the burdensome requirement of providing an immense cooling capacity within the containment even though it would hopefully never be called upon to operate. Such cooling equipment would have to be maintained in an operational state for the life of the plant.

Other patents exist which propose the use of in-core heat pipes for the purpose of extracting heat from the core of the reactor during normal power operation. Such patents are exemplified by U.S. Pat. No. 3,378,449 issued to J. J. Roberts et al on Apr. 16, 1968; U.S. Pat. No. 3,403,075 issued on Sept. 24, 1968 to P. Fiebelmann; U.S. Pat. No. 3,509,386 issued to A. W. Byrd issued on Apr. 28, 1970; and U.S. Pat. No. 3,668,070 issued to P. Fiebelmann on June 6, 1972. These patents do not, however, address the problem of catching and solidifying a core that has melted due to a serious mishap.

SUMMARY OF THE INVENTION

It can be seen, therefore, that a reliable, passive system is needed for catching, dispersing to a non-critical configuration, and cooling a molten reactor core after it has melted through the reactor vessel. While such a system should be simple of operation in order to assure its effectiveness, it should nevertheless be composed of a plurality of independently operable components so that failure of one component would not seriously compromise the overall effectiveness of the system. Additionally, such a system should be able to passively stand by in a passive yet constantly ready state for long periods of time without requiring periodic maintenance and should be able to immediately and automatically accomplish its function at any time within a forty year life span without human or mechanical intervention. Desirably, the system should be relatively inexpensive yet not subject to damage during the worst conceivable seizmic event so that a local earthquake, which may be the initiating cause of a core meltdown, does not incapacitate the melted core cooling system. Furthermore, the system should be capable of operating in the presence of tremendous thermal gradients without experiencing a failure, and finally, the system should not discharge large quantities of heat or steam to the interior of the containment building.

A system which overcomes the deficiencies and disadvantages of the prior art techniques of cooling molten cores and which provides the desirable characteristics above described, has been developed and forms the subject matter of the present invention. Accordingly, an improved nuclear reactor installation of the type having a nuclear core contained within a vessel disposed within a chamber formed within a hermetically sealed containment building is provided with a system for protecting the chamber walls of the chamber in the event the nuclear core melts through the vessel in a nuclear core meltdown accident. The system includes a multiplicity of independently operable heat pipes whose evaporator ends are positioned adjacent to a wall of the chamber on the inside of the chamber and whose condensing ends are maintained in a heat exchange relationship with a heat sink located exterior to the containment building. The multiplicity of heat pipes are disposed in a star-like array radiating outwardly from the nuclear reactor with their evaporator ends disposed either adjacent to the side walls of the chamber or adjacent to the floor of the chamber. Each of the independent heat pipes penetrate through and are hermetically sealed to the containment building at a point intermediate their evaporator and condenser ends whereby the heat pipes are permitted unrestrained axial thermal growth. In order to achieve most efficient operation, the heat pipes are disposed with their condenser ends at an elevation higher than the elevation of their evaporator ends.

For that portion of the system in which the heat pipes originate generally vertically under the nuclear core adjacent to the floor of the chamber, the system further includes a shallow upwardly facing slightly conical basin disposed below the evaporator ends of the heat pipes intermediate the heat pipes and the floor of the chamber. Each evaporator of each heat pipe includes thermally conducting fins attached thereto for increasing the effective thermal contact between the molten core material and the heat pipes. Such an arrangement protects the underlying shallow basin from the heat generated by the molten nuclear core. The basin itself desirably consists of a high melting point refractory metal and is attached to the floor of the chamber at a centrally located position so that the basin is permitted unrestrained thermal growth in a radially outwardly direction. In order to further protect the floor of the chamber, the system may be provided with a thermal insulator disposed between the shallow conical basin and the floor of the chamber. Similarly, the adiabatic sections of the heat pipes which penetrate through the concrete of the containment building, are surrounded by thermal insulation in order to prevent dehydration of the concrete.

In another portion of the system, a plurality of heat pipes are arranged to have their evaporator ends extending downwardly adjacent to the side walls of the chamber. Similar heat conducting fins attached thereto are arranged in a manner so as to intercept most of the radiation emitted by the molten core which has fallen to the floor of the chamber. In other respects, this second portion of the system is similar to the heat pipe arrangement which is disposed adjacent to the floor of the chamber.

The heat pipes which together constitute the core cooling portion of the system, are desirably high performance, high temperature heat pipes. As such, they would preferably contain a metallic working fluid such as liquid sodium, cesium, potassium, mercury, or a eutectic alloy such as NaK in order to provide minimum internal pressure and reduce the danger of rupture of the pipes at the working temperature.

BRIEF SUMMARY OF THE DRAWINGS

The present invention may be better understood and its numerous objects and advantages will become apparent to those skilled in the art by reference to the accompanying drawings wherein like reference numerals refer to like elements in the several figures and in which.

DESCRIPTION OF THE PREFERRED EMBODIMENT

Figure 1:
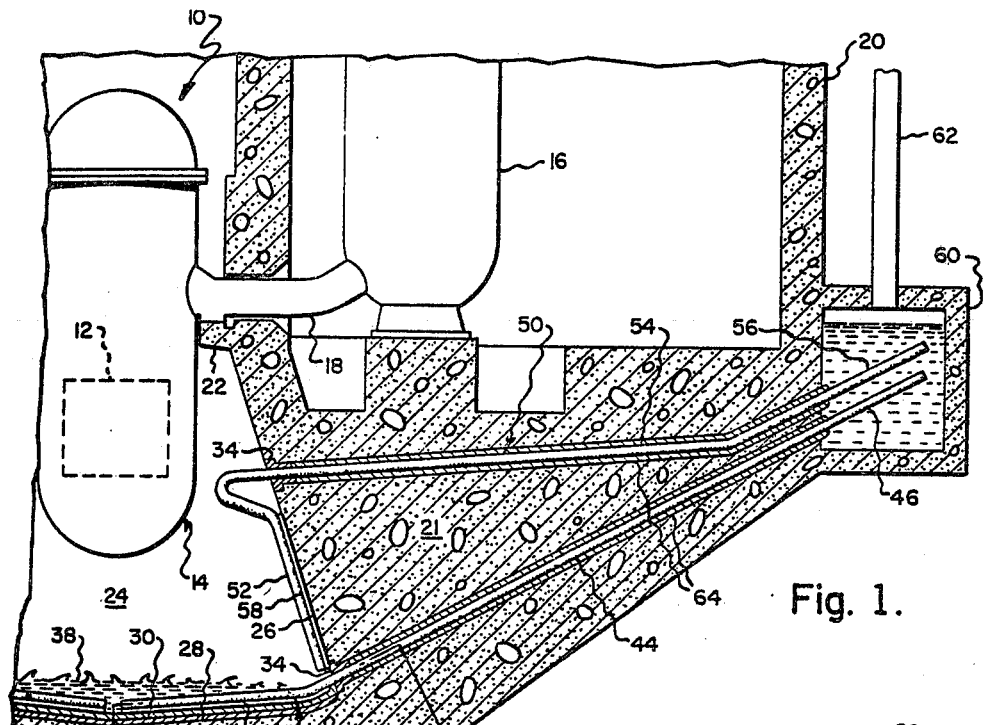
FIG. 1 is a side elevation view in section showing a portion of the containment building of the nuclear reactor equipped with the molten core cooling system of the present invention.

While the invention is susceptible of various modifications and alternative constructions, there is shown in the drawings and there will hereinafter be described in detail a description of the preferred embodiment of the invention. It is to be understood, however, that the specific description and drawings are not intended to limit the invention to the specific form disclosed. On the contrary, it is intended that the scope of this patent include all modifications and alternative constructions thereof falling within the spirit and scope of the invention as expressed in the appended claims.

In a preferred embodiment of the present invention, as depicted in FIG. 1, a nuclear reactor 10 having a vessel 14 and an internally mounted reactor core 12 is suspended within a reactor chamber 24 formed within the base 21 of the containment building 20. The reactor vessel 14 is supported by a cantilevered support member 22 upon which rests the reactor coolant piping 18 as it leaves the reactor vessel 14. Reactor coolant piping 18, in the case of a pressurized water reactor, fluidically connects the interior of the reactor vessel 14 with a steam generator 16 which generates steam for its ultimate delivery to a steam turbine.

The general function of the present invention is to protect the concrete walls of chamber 24 from the damaging effects of both the extreme heat and radiation generated by a nuclear core 12 which has melted and dropped through the bottom of the reactor vessel 14 as shown generally at 38. Of primary concern are both the cavity floor 28 and the vertical walls 26. Damage to these walls is to be avoided if at all possible on the occurance of such an accident in order that the radioactive materials associated with a molten core 38 are prevented from escaping either to the exterior of chamber 24 or the exterior of the containment building 20. Therefore, the present invention provides a system of heat pipes 40 and 50 which respectively protect the chamber floor 28 and the chamber wall 26 by collecting a portion of the heat generated by the core in chamber 24 and transporting the heat to a location exterior to the containment building 20.

It has been found that heat pipes are well suited for this function in that they can be designed to transfer large quantities of heat with very little thermal resistance, can remain passive for large periods of time without maintainance and can automatically begin their heat transfering function without need of human or mechanical intervention. Furthermore, a heat pipe is ideal for accomplishing these functions inasmuch as each heat pipe constitutes a hermetically sealed unit which is independent from all the other heat pipes of the system. The hermetically sealed feature of the heat pipe permits the heat pipe to penetrate from the interior of chamber 24 to the exterior of the containment building 20 without running the risk of pumping radioactive material to the exterior of the containment envelope in the event that one end of the heat pipes is breached.

Heat pipes 40 and 50 are arranged with their evaporator sections 42 and 52 adjacent to the reactor chamber's floor 28 and wall 26 respectively so as to shield the concrete base 21 from the damaging heat and radiation of the molten core 38 and so as to contain the core. Each of these heat pipes has its condenser section 46 and 56 respectively located in a water reservoir 60 external to the reactor containment building 20. The condenser sections and the evaporator sections of the heat pipes are fluidically connected by adiabatic sections 44 and 54 respectively which penetrate through the reactor containment building 20 through base 21. Each of the adiabatic sections 44 and 54 are surrounded by thermal insulation 64 in order that the concrete of the base 21 and the containment building 20 not be exposed to excessive heat which could possibly cause concrete dehydration and subsequent failure. As may be seen in FIG. 1, water reservoir 60 is vented by a vent pipe 62 directly to the atmosphere exterior to the containment building 20. As may also be seen from FIG. 1, condenser sections 46 and 56 of heat pipes 40 and 50 respectively are positioned at elevations higher than the elevations of their respective evaporator sections so that the working fluid does not have to work against a gravitational head in its return to the evaporator section. An angle of slant no less than 30° is preferred in order that the maximum capability of the heat pipe be achieved.

As can be seen in FIG. 1, evaporator ends 42 of heat pipes 40 are disposed vertically below reactor vessel 14. A slightly conical upwardly facing shallow basin 30 is also disposed below evaporator sections 42. Basin 30 is provided to prevent direct contact between molten core 38 and base 21. Basin 30 desirably consists of a refractory metal having a high melting point such as tungsten, tantalum carbide, zirconium carbide, niobium carbide, hafnium carbide or graphite. However, it is predicted that the temperature of molten core 38 would exceed the melting point of refractory basin 30 so that refractory basin 30 must be either directly cooled by a cooling system or shielded from the elevated temperatures of the core. The present invention chooses the latter arrangement. Accordingly, heat pipes 40 are arranged in a star-like pattern radiating outwardly from a position under the core 12 in a manner which best shields refractory basin 30 from the temperature of the core.

Figure 2:
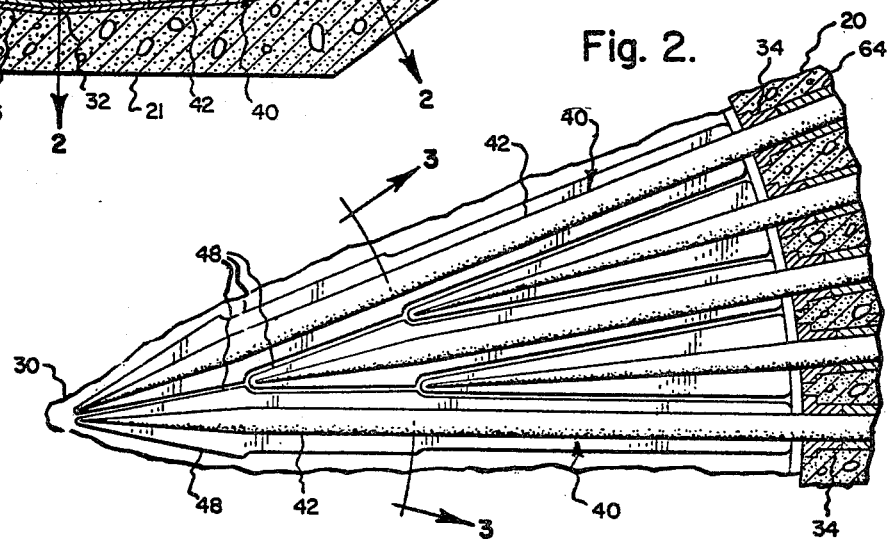
FIG. 2 is a plan view of a portion of the core cooling system taken along view lines 2—2 of FIG. 1.

The preferred arrangement of the invention is illustrated in FIG. 2 in which heat pipes 40 are arranged in an outwardly radiating star-like array. Each heat pipe 40 includes thermal conducting fins 48 attached to its evaporator end 42. As can be seen, fins 48 are shaped to butt one against another to almost completely cover the upwardly facing surface of basin 30. Adjacent fins 48 however, are separated by a slight gap in order to accomodate the thermal expansion expected when heated by a molten core 38. Evaporator sections 42 of heat pipes 40 are vertically supported by but not anchored to underlying basin 30. In this manner, heat pipes 40 are permitted to operate at a temperature in excess of the temperature of basin 30 without incurring the significant problems of differential thermal expansion. Thermal expansion of the heat pipes 40 are further accommodated by the provision of anchoring heat pipes 40 to base 21 of the containment building 20 at only one point: the point at which the heat pipes enter the concrete foundation 21. At this position, the heat pipe is hermetically sealed to the base 21 by seal 34 so that the passage through which the adiabatic section 44 of the heat pipe passes is hermetically isolated from the interior of chamber 24. Seals 34 must be of such a nature as to be able to withstand radial expansion of heat pipe 40. As can be seen, with this arrangement, heat pipes 40 are permitted axial growth in both the inward and outward direction from the attachment point at seal 34 and the hermetic containment envelope is maintained.

While the above described arrangement effectively shields basin 30 from excessive temperatures, it is still expected that the basin 30 will be exposed to an extreme elevated temperature. Accordingly, basin 30 will also experience thermal growth. In anticipation of the thermal growth expected in basin 30, the basin is attached to base 21 only in one centrally located point 32. This arrangement permits basin 30 to undergo unrestricted radial expansion so that warping effects are minimized. As can be seen in FIG. 1, a layer of thermal insulation 36 such as a layer of alumina bricks may be placed under basin 30 in order to protect the underlying concrete of base 21 from thermally caused dehydration.

The above described arrangement exposes the evaporator sections 42 of heat pipes 40 directly to the molten core 38. It should be recognized, however, that basaltic blocks as taught in U.S. Pat. No. 3,702,802 may also be placed above the heat pipes in order to reduce the thermal shock placed on the heat pipes 40 as well as to reduce the heat release per unit volume of core material by diluting the molten core material with material from the basalt blocks. An additional measure which may be taken to avoid the excessive concentration of heat of the molten core is the formation of basin 30 and evaporator sections 42 of heat pipes 40 in a nearly horizontal manner. The molten core material would then be expected to spread out in a relatively thin layer. Other measures may be taken such as those taught in U.S. Pat. No. 4,036,688 in order to prevent the molten core from forming a critical geometry.

In a manner similar to that described above for heat pipes 40, heat pipes 50 are provided with thermally conducting fins 58 which spread out and shield the inner surface 26 of chamber 24 at portions which are not directly shielded by the heat pipe evaporator section 52 itself. While not shown in the drawing of FIG. 1, it may also be desirable to line the inner surface of chamber 24 with a thermal insulator such as refractory bricks in order to prevent the dehydration of the concrete base 21. Heat pipes 50 are preferably arranged in a star-like pattern which radiates outwardly from the reactor. As can be seen from FIG. 1, an inwardly projecting "knee" of heat pipe 50 is provided in order to intercept and absorb the upwardly directed radiations emminating from molten core 38. In this manner, the upper portions of the cavity 24 are protected against the damaging heat and radiations emmited by the core. Heat pipes 50 are also anchored at that point at which each heat pipe enters the concrete wall of the chamber at seal 34 so that heat pipes 50 may undergo unrestricted thermal expansion in both the inward and outward directions.

Figure 3:
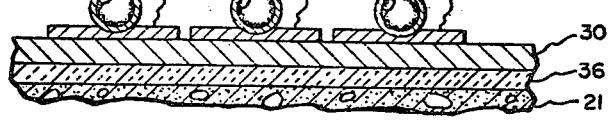
FIG. 3 is a cross-sectional view of a portion of the cooling system of the present invention taken along the view lines 3—3 of FIG. 2.

Turning now to an examination of FIG. 3, a typical cross-section of the evaporator sections of heat pipes 40 is shown. Also shown are a portion of the base 21, the thermal insulation 36, the refractory metal basin 30 and the fins 48. Wicking material 66 resides on the interior of the heat pipes 40. As is well understood, the materials from which heat pipes 40 are constructed depend upon a number of factors including the amount of heat which must be transported, the maximum temperatures expected, and the compatability of the materials used in the pipe which included the pipe itself, the working fluid, and the wicking material. It has been calculated that for a 3,800 megawatt thermal core, 136 six inch sodium filled heat pipes with evaporator lengths of eight feet and condenser lengths of twelve feet would be adequate to effectively remove the heat generated by molten core 38 so that basin 30 is protected from melting and core 38 is prevented from boiling. Other possible candidates for the working fluid of the heat pipes 40 and 50 includes potassium, cesium, mercury, and one of the eutectic alloys such as NaK. If the selected working fluid were to be liquid sodium, suitable heat pipe materials might include one of the alloys having trade names Nickel 200, Monel 400, Inconel 600, or Inconel 800. In addition, long heat pipes containing a plurality of working fluids are possible. Such heat pipes, when called upon to operate, would automatically separate themselves into zones determined by the latent heat of evaporation of the various working fluids as well as the temperature of the evaporation of the various working fluids.

I claim:

1. In a nuclear reactor installation of the type having a nuclear core located within a vessel, the vessel being disposed within a chamber formed by interior walls of a hermetically sealed containment building, the chamber having at least a bottom wall and a side wall, an improved system for protecting at least the bottom wall and the lower portions of the side wall of the chamber in the event that the nuclear core melts through the vessel in a nuclear core meltdown accident, and for cooling the molten core, said improvement comprising: means defining a shallow upwardly facing metallic basin mounted on and in intimate contact with the chamber bottom wall, a plurality of heat pipe means, said heat pipe means each including a heat pipe having displaced evaporator and condenser sections, said evaporator sections of at least some of said heat pipes being positioned adjacent to the upper surface of said basin defining means, the some of said heat pipes which are adjacent to the basin defining means upper surface being disposed in a star-like array radiating outwardly from a point vertically aligned with the reactor core, the evaporator sections of other of said heat pipes of said heat pipe means being positioned adjacent to a portion of the surface of the side wall, said heat pipe means further including heat conducting fins attached to said heat pipe evaporator sections, said fins extending generally parallel to and being in abutting contact with the wall surfaces adjacent to their respective heat pipes to thereby substantially completely shield said wall surfaces, said heat pipe means penetrating through and each being hermetically sealed to said containment building at a point intermediate the evaporator and condenser sections of their heat pipes whereby said heat pipes are permitted unrestrained thermally induced axial growth, said heat pipe means in the region of the condenser sections of the heat pipes being maintained in heat exchange relationship with a heat sink located to the exterior of the containment building, the evaporator section of the heat pipe of each heat pipe means including the lowest elevation between the condenser and the evaporator sections and the condenser sections of the heat pipes of said heat pipe means being disposed at an elevation higher than the elevation of said evaporator sections.

2. The improved nuclear reactor installation as recited in claim 1 wherein said metallic basin defining means is attached to the bottom wall of the chamber at a centrally located position, whereby the basin is permitted unrestrained thermal growth in a radially outwardly direction.

3. The improved nuclear reactor installation as recited in claim 2 wherein the shallow upwardly facing metallic basin of said basin defining means is conical in form.

4. The improved nuclear reactor installation as recited in claim 3 further including a thermal insulator disposed between said basin defining means and the bottom wall of said chamber, whereby the chamber bottom wall is protected against dehydration.

5. The improved nuclear reactor installation as recited in claim 1 wherein the heat pipes of said heat pipe means each include an adiabatic portion connecting said evaporator section and said condenser section, and wherein said adiabatic heat pipe portions are surrounded by thermal insulation in order to prevent dehydration of the material comprising the containment building.

6. The improved nuclear reactor installation as recited in claim 1 wherein said heat pipes of said heat pipe means include therein a metallic working fluid.

7. The improved nuclear reactor installation as recited in claim 1 wherein said heat pipes of said heat pipe means contain a plurality of different working fluids.

8. The improved nuclear reactor installation as recited in claim 1 wherein said heat pipes of said heat pipe means include therein NaK working fluid.

9. The improved nuclear reactor installation as recited in claim 1 wherein the said exterior heat sink includes an annularly shaped water tank formed around at least a portion of the containment building.

* * * * *